United States Patent [19]

Weller

[11] 4,052,746
[45] Oct. 4, 1977

[54] HEAD ASSEMBLY FOR MAGNETIC RECORDERS

[75] Inventor: Ivor Weller, San Lorenzo, Calif.

[73] Assignee: Xerox Corporation, Stamford, Conn.

[21] Appl. No.: 654,488

[22] Filed: Feb. 2, 1976

[51] Int. Cl.² ............... G11B 21/24; G11B 21/08; G11B 5/016

[52] U.S. Cl. .................................. 360/109; 360/99; 360/106

[58] Field of Search ............... 360/109, 99, 106, 97, 360/98

[56] References Cited

U.S. PATENT DOCUMENTS 3,770,905  11/1973  Sperry .................... 360/109
3,787,644  1/1974   Schneider ................ 360/109
3,913,137  10/1975  Morgan ................... 360/98

*Primary Examiner*—Robert S. Tupper
*Attorney, Agent, or Firm*—M. J. Colitz; T. J. Anderson; B. P. Smith

[57] ABSTRACT

A head assembly for magnetic recorders includes a mounting bracket designed for increased rigidity. Releasably attached to the mounting bracket are two head carriages, each having affixed thereon a magnetic recording and reproducing head. The heads are positioned such that as the mounting bracket moves radially with respect to two recording discs, each head is individually precisely radially positionable with respect to any recording track defined on its respective disc.

7 Claims, 5 Drawing Figures

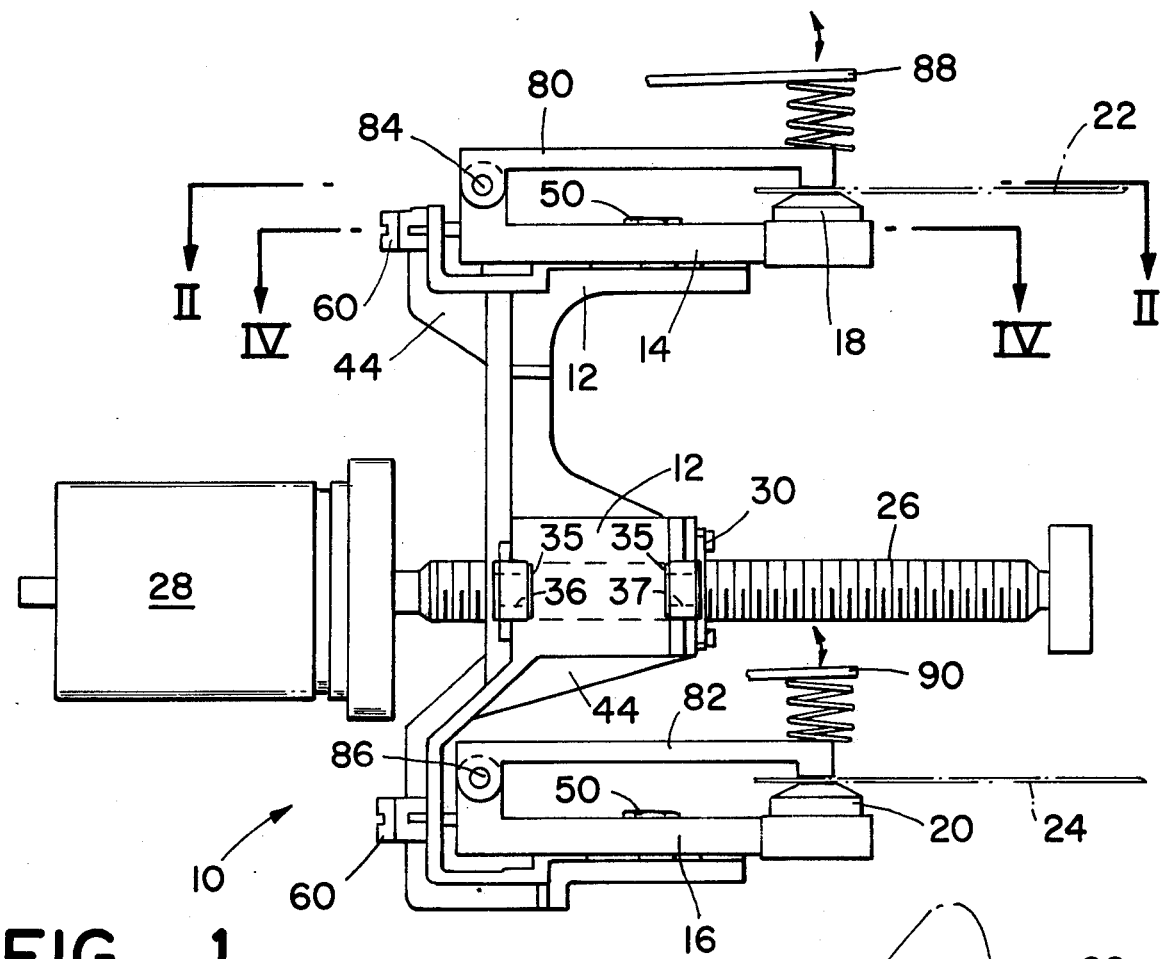
FIG_1
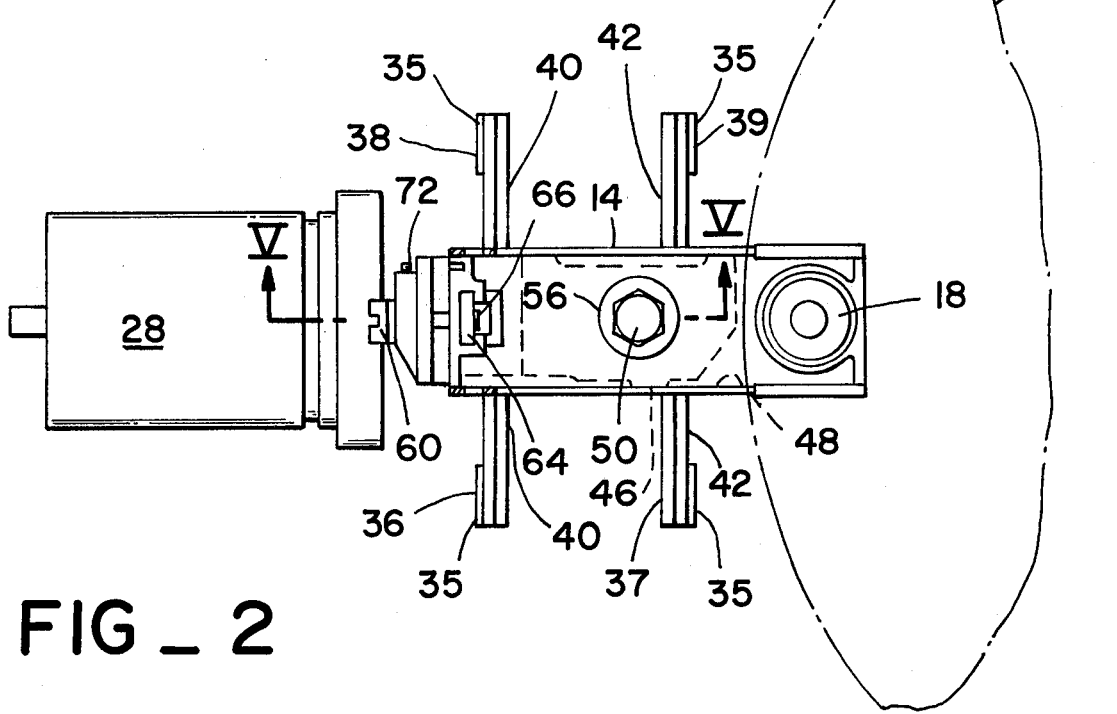
FIG_2

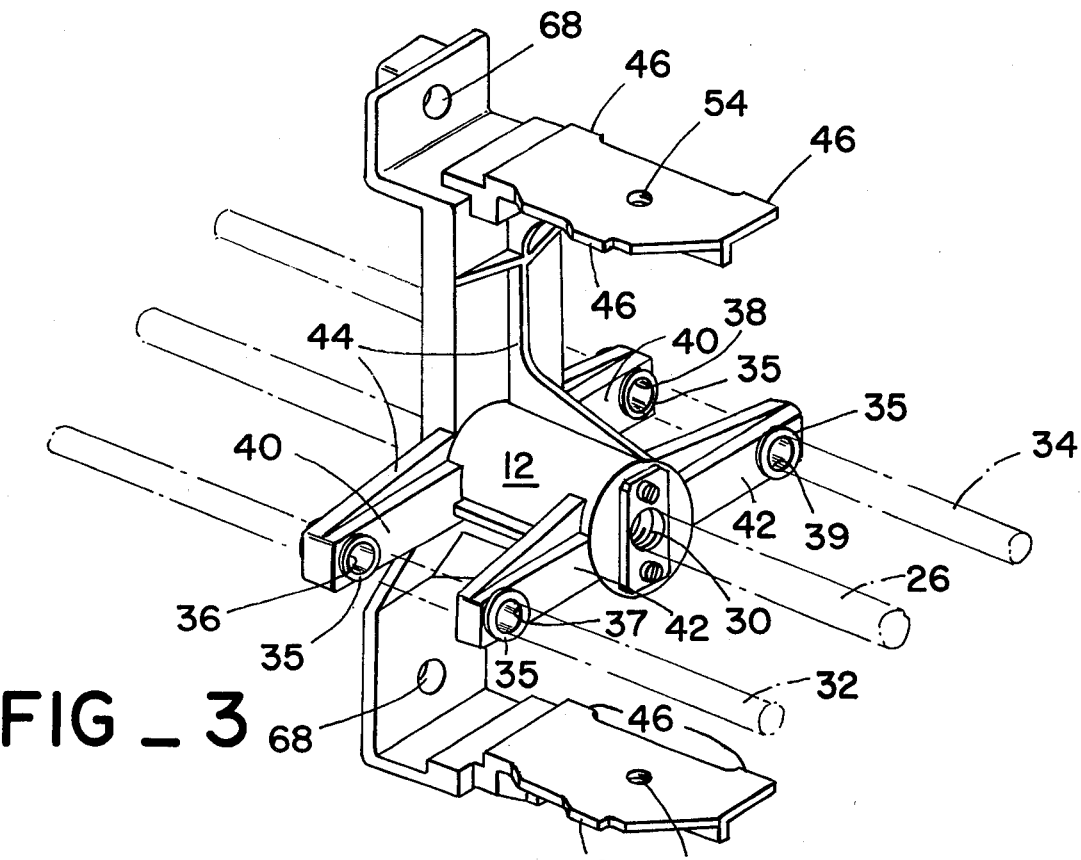

HEAD ASSEMBLY FOR MAGNETIC RECORDERS

BACKGROUND OF THE INVENTION

1. Field of the Invention

The present invention relates to means for accessing flexible magnetic discs, and more specifically relates to an improved means, in a radially movable head assembly, for retaining a precise positionable relationship of the recording heads with respect to the associated magnetic discs, and means for independently removing each head from the head assembly and for independently adjusting the radial position of each head to insure correspondence of position among different heads.

2. Description of the Prior Art

Head assemblies for magnetic recorders have either been of a fixed type or of a type where dynamic radial positioning of the heads is allowed with respect to the recording disc. The fixed type of recording heads can only be individually repositioned relative to the recording disc by means of adjustment screws for adjustment of head tilt and level relative to the associated disc, due to the fact that such heads are designed to float with an air bearing effect near the disc without actually touching the disc surface. Otherwise, the heads remain in a position fixed relative to the recording discs. The radially movable type of recording head assembly allows each head to access different tracks on its respective disc. A problem with such systems has been the difficulty of designing simple assemblies that are rigid enough to retain the proper positioning desired of the heads with respect to their discs, while also providing a simple means for individually adjusting the position of each head, and also for removing the heads when required without being forced to disassemble the entire device. Radially adjusting each head individually using screws or other means has been available on some recorders, but no dual flexible-disc head assemblies allowing for bidirectional, individual head adjustment along the radial direction of the disc is known to applicant. Such flexible disc heads need to be radially adjusted so that flexible discs, which are commonly inserted in different disc drives at different times, are always in perfect alignment with the heads, regardless of which machine they are in.

SUMMARY OF THE INVENTION

The present head assembly invention provides unique means for improving the ability to precisely position recording heads with respect to recording discs. Specifically, two recording heads are mounted on a mounting bracket by means of head carriages that allow each head to be independently connected to the mounting bracket. The mounting bracket is designed to rigidly hold the head so that as the mounting bracket is operatively positioned along an axis parallel to the planes of the discs and in a direction toward or away from the center of the discs, the heads are operatively positioned radially along the surface of their respective discs. Further, adjustment means are provided for individually adjusting each head radially with respect to its associated disc, in a manner such that both heads are simultaneously positionable by the mounting bracket on corresponding tracks on their respective discs.

Accordingly, it is an object of this invention to provide a simple yet rigid means for releasably attaching individual carriages to a head mounting bracket.

Another object of this invention is to provide unique individual head adjustment means for insuring that each head is radially aligned with respect to its associated disc so that corresponding tracks are accessed with each given position of the head mounting bracket.

BRIEF DESCRIPTION OF THE DRAWINGS

These and other objects and advantages of the present invention will become more apparent upon reference to the following description and accompanying drawings, in which:

FIG. 1 is a side view of the head assembly of the present invention illustrating the relationship of the assembly to associated discs;

FIG. 2 is a partial plan view of the head assembly of FIG. 1 taken along the line II—II of FIG. 1;

FIG. 3 is an isometric view of the mounting bracket illustrating the means by which the bracket is held and moved in the magnetic recorder;

FIG. 4 is an enlarged partial plan view of the head assembly of FIG. 1 taken along the line IV—IV of FIG. 1; and FIG. 5 is an enlarged sectional view of the adjustment screw and screw fastener means taken along the line V—V of FIG. 2.

DESCRIPTION OF THE PREFERRED EMBODIMENT

FIG. 1 shows a head assembly 10 in a magnetic recorder. It includes a mounting bracket 12, two head carriages 14 and 16, and two heads 18 and 20. Each head 18, 20 contacts the surface of a disc, respectively head 18 with disc 22 and head 20 with disc 24. These discs rotate in a conventional way so that when a head 18, 20 is positioned on one of the concentric recording tracks defined on each of the discs 22, 24, the associated head has access to the entire length of the track in one revolution of the respective disc. Note that each track on a disc is only approximately 0.012 inches in width and that track-to-track spacing is only 0.02 inches.

As can be seen, the relative position of each head 18, 20 with respect to its associated disc is of paramount importance in data recording and read-out operations. This is especially important due to the interchangeability of discs between different magnetic recorders. The mounting bracket 12 operates to position precisely each head with respect to its associated disc recording surface. As shown in FIG. 1, the preferred embodiment of the invention uses a precise lead screw 26, actuated by a step motor 28, to operatively adjust the position of the mounting bracket 12 via a threaded bore 30 defined therein. FIG. 3 gives a second view of the relationship of lead screw 26 to the bore 30 of mounting bracket 12. With reference again to FIG. 1, it is apparent that the lead screw 26 acts to move the mounting bracket 12, and thus the heads 18, 20 affixed thereto, in a radial direction either toward or away from the rotational axis of the discs 22, 24.

To insure that no other degrees of freedom of movement exist for the heads 18 and 20, i.e. to maintain the heads in a fixed relationship with their respective discs 22, 24, the mouting bracket 12 is fixed relative to the discs 22, 24 by means of two rods 32, 34 mounted in the recorder. As illustrated in FIG. 3, these rods 32, 34 are fitted respectively through bores 36, 37 and 38, 39 defined in bracket arms 40, 42 of the mounting bracket 12. The rods 32, 34 act to fix and maintain the position of the mounting bracket in the recorder and thus with respect to the discs 22, 24 along all degrees of freedom except radially along the axis of the lead screw 26, as described above. A tight fit is provided in the bores 36, 37 and 38, 39 by means of bushings 35 installed therein. In addition, conventional stiffening members including those indicated at 44 are added to the mounting bracket 12 to further maintain the fixed orientation of the head carriages 14, 16, and correspondingly of the heads 18, 20 with respect to the discs 22, 24.

The head assembly 10 also includes means for releasably attaching the head carriages 14, 16 to the mounting bracket 12. These means are designed to fix the heads 18, 20 to the mounting bracket 12 and thus normally allow only radial motion of the heads with respect to the discs 22, 24, as a function of the position of the mounting bracket 12. As seen in FIG. 1, and more particularly in FIG. 5, the attachment means include a fastener 50 for each head carriage 14, 16. The fastener 50 is disposed in an opening 52 in each head carriage and engages a threaded bore 54 defined in said mounting bracket 12 to thereby hold in place the head carriage. Relative placement of the threaded bore 54 for each head carriage is more clearly shown in FIG. 3. The fastener 50 further includes resilient fastener means which in the preferred embodiment constitute a spring washer 56. This washer 56 is added to allow the fastener 50 to press each head carriage 14, 16 against the mounting bracket 12 with a force sufficient enough to prevent vibrational or other unwanted movement of the carriage with respect to the mounting bracket 12 and thus with respect to the associated discs, while allowing the relative position of the carriage to be adjusted by adjustment means described below.

The adjustment means provide means for independently adjusting the radial position of each head to insure that both heads 18 and 20 are simultaneously positionable by the mounting bracket 12 on corresponding tracks on their associated discs 22, 24. The adjustment means enables the individual adjustment of each of the head carriages 14, 16 and thus their respective heads 18, 20 either in an inward or outward direction with respect to the mounting bracket 12 and thus with respect to the corresponding discs 22, 24. Specifically, the adjustment means for each head carriage 14, 16 comprises an ajustment screw 60 and screw fastening means, as shown most clearly in FIGS. 2, 4 and 5. In the present embodiment, the screw fastening means is a nut 64 having a threaded bore defined therein that is limited in movement in an axial direction and rotatively relative to said nut bore, by a cavity 66 defined in each respective head carriage.

As seen in FIG. 5, the screw 60 is disposed through a bore 68 in the mounting bracket 12 (see FIG. 3 for the illustration of the placement of the two bores 68, one for each head carriage 14, 16), and further disposed through a bore 70 in each respective head carriage to threadably engage the nut 64.

As shown in FIG. 4, each adjustment screw 60 is also restrained by means of a set screw 72 which is threadably disposed in another threaded bore 74 defined in said mounting bracket 12 perpendicular to bore 68, such that bore 74 opens into bore 68. The set screw 72, when in place in bore 74, abuts the screw 60, and is caused to lie in a circumferential slot 76 defined in screw 60, with the result that screw 60 may be rotated but not moved axially within the bore 68. Thus, since the nut 64 is likewise limited in axial movement by cavity 66, and further limited thereby from rotating as well, the result is that a carriage 14, 16 is adjustable in a radial direction, i.e. either inwardly or outwardly with respect to the mounting bracket 12 by the simple adjustment means of turning screw 60 either in a clockwise or counterclockwise direction.

The means for releasably attaching each of the head carriages 14, 16 to the mounting bracket 12 further includes, as shown in FIGS. 2 and 3, guide surfaces 46 defined in the mounting bracket 12 and arranged such that these surfaces 46 mate with corresponding surfaces 48 on the underside of head carriages 14, 16. As a result, the head carriages are confined to precisely radial movement only once the carriages are installed on the bracket 12.

The range of adjustment of each of the head carriages 14, 16 relative to mounting bracket 12 is limited by the opening 52 defined in each head carriage 14, 16. In the preferred embodiment, the opening 52 is defined to be a slot oriented lengthwise along the axis of the associated adjustment screw 60, as illustrated in FIG. 4. The opening 52 in the present embodiment allows for positioning and adjustment of each head 18, 20 within the range ±.052 inches, but other adjustment ranges may also be used.

As shown in FIG. 1, to insure that proper head disc contact is maintained, arms 80, 82 may be mounted on the head assembly. They are operatively positioned by spring biasing means 88, 90 to abut their respective disc at an area on the disc surface directly opposite the area abutted by the head, to hold the flexible disc in firm contact with the head. Appropriate electromechanical means (not shown) are normally provided to lift the arms 80, 82 away from the disc against the bias of springs 88, 90 whenever the disc is not being used for a data processing operation. In this manner, the arms 80, 82 are prevented from interfering with the insertion or removal of the discs.

What is claimed is:

1. A head assembly for a dual flexible disc magnetic recorder, each disc having defined on its recording surface a plurality of concentric recording tracks for the storage of information thereon, said head assembly comprising:

mounting bracket means;

a pair of head carriages, each including a recording head affixed thereto;

means for releasably attaching each of said head carriages to said mounting bracket means, with its respective head operatively abutting the recording surface of one of said discs;

means connected to said mounting bracket means for moving said mounting bracket means radially with respect to the recording discs to enable the positioning of said head on any given track defined on its respective said recording disc; and adjustment means connected to each of said carriages for individually adjusting the radial position of each head carriage with respect to its associated disc independently of the movement of said mounting bracket means by said means for moving in order for said heads to be simultaneously positionable by said mounting bracket means on corresponding tracts on their respective discs, said adjustment means for each head carriage comprising an adjustment screw disposed through a pair of first bores respectively defined in said mounting bracket means and said head carriage, means for limiting movement of said adjustment screw in said first bore of said mounting bracket means such that said adjustment screw is allowed to have only rotative movement with respect to said mounting bracket means, and a screw fastening means mounted in a second bore defined in said head carriage and fastened to said adjustment screw such that the turning of such adjustment screw causes said screw fastening means and thus the head carriage and head thereon to be moved in an inward or outward direction relative to said mounting bracket means and thus radially with respect to the recording disc corresponding to said head carriage.

2. The head assembly of claim 1 wherein said means for limiting movement of said adjustment screw comprises:
   a setscrew;
   a threaded setscrew bore defined in said mounting bracket means, said threaded setscrew bore having its axis perpendicular to the axis of (the adjustment screw mounting bracket) said first bore of said mounting bracket means and disposed radially outwardly therefrom; and
   a circumferential slot defined in said adjustment screw and positioned such that with said setscrew in said threaded setscrew bore, said setscrew extends into said slot to thereby allow only rotative movement by said adjustment screw.

3. The head assembly of claim 1 wherein said screw fastening means comprises a nut having a threaded bore defined therein, said nut being limited in movement in an axial direction relative to said nut bore by said head carriage, and wherein said screw fastening means comprises a threaded shaft defined on one end of said adjustment screw such that said screw may threadably engage said nut, and wherein rotation of said screw causes said nut, and correspondingly said head carriage, to be shifted in position either inwardly toward or outwardly away from said mounting bracket means along the plane of said carriage's corresponding recording disc.

4. The head assembly of claim 1 wherein said means for releasably attaching each of said head carriages to said mounting bracket means comprises a head carriage fastener including resilient fastening means, said fastener being disposed through an opening defined in said head carriage for attaching said head carriage to said mounting bracket with a force sufficient to prevent vibrational or other unwanted movement of said head carriage with respect to said mounting bracket, while allowing, when required, for said adjustment screw to radially adjust the head carriage position with respect to said carriage's corresponding recording disc.

5. The head assembly of claim 4 wherein the means for releasably attaching each of said head carriages further includes guide surfaces defined on the mounting bracket means and positioned such that said guide surfaces mate with corresponding surfaces on the carriages for further retaining the proper position of the head carriages, such that movement only along the axis corresponding to the adjustment screw is allowed between the mounting bracket means and said carriages, and thereby between said carriages and their respective discs.

6. The head assembly of claim 4 wherein said resilient fastening means comprises a threaded shaft defined on said head carriage fastener, a threaded bore defined in said mounting bracket means, and spring washer means, wherein said threaded shaft threadably engages said mounting bracket means, said spring washer means allowing said head carriage fastener to join said head carriage to said mounting means with a force that is sufficient to only allow motion between the mounting bracket means and said carriages that is radial with respect to the carriage's corresponding discs, said motion being a function of the adjustment means.

7. The head assembly of claim 4 wherein said opening defined in said head carriage is defined to have a slotted shape oriented lengthwise along the axis of said adjustment screw, said opening acting to limit the allowable extent of radial positon adjustment of each said carriage by said adjustment screw.

* * * * *